United States Patent [19]

Phillips

[11] 4,206,784
[45] Jun. 10, 1980

[54] ACCESS DOOR

[76] Inventor: Leonard Phillips, 6001 Bayou Grande Rd., St. Petersburg, Fla. 33703

[21] Appl. No.: 869,693

[22] Filed: Jan. 16, 1978

Related U.S. Application Data

[63] Continuation of Ser. No. 719,736, Sep. 2, 1976, abandoned.

[51] Int. Cl.² ............................................. F16L 55/10
[52] U.S. Cl. ...................................... 138/92; 49/465; 160/96; 220/259
[58] Field of Search .......................... 174/101; 138/92; 220/243, 244, 254, 256, 259; 49/465, 67, 63, 61, 62, 55; 160/95, 96

[56] References Cited

U.S. PATENT DOCUMENTS

| | | | |
|---|---|---|---|
| 2,000,366 | 5/1935 | Victor | 160/95 |
| 2,167,597 | 7/1939 | Webb | 138/92 X |
| 2,209,580 | 7/1940 | Sargent | 138/92 X |
| 2,507,885 | 5/1950 | Byrnes | 138/92 |
| 3,494,651 | 2/1970 | Fork et al. | 138/92 |

FOREIGN PATENT DOCUMENTS

| | | | |
|---|---|---|---|
| 418966 | 2/1926 | Fed. Rep. of Germany | 220/243 |
| 633852 | 10/1927 | France | 220/243 |

*Primary Examiner*—William D. Martin, Jr.
*Attorney, Agent, or Firm*—Stein & Frijouf

[57] ABSTRACT

An access door primarily designed to provide an insulated entrance to heating, ventilating and air conditoning ducts consisting of a two-pan structure lockably connected together by a simple unfastening means.

7 Claims, 7 Drawing Figures

U.S. Patent
Jun. 10, 1980
4,206,784
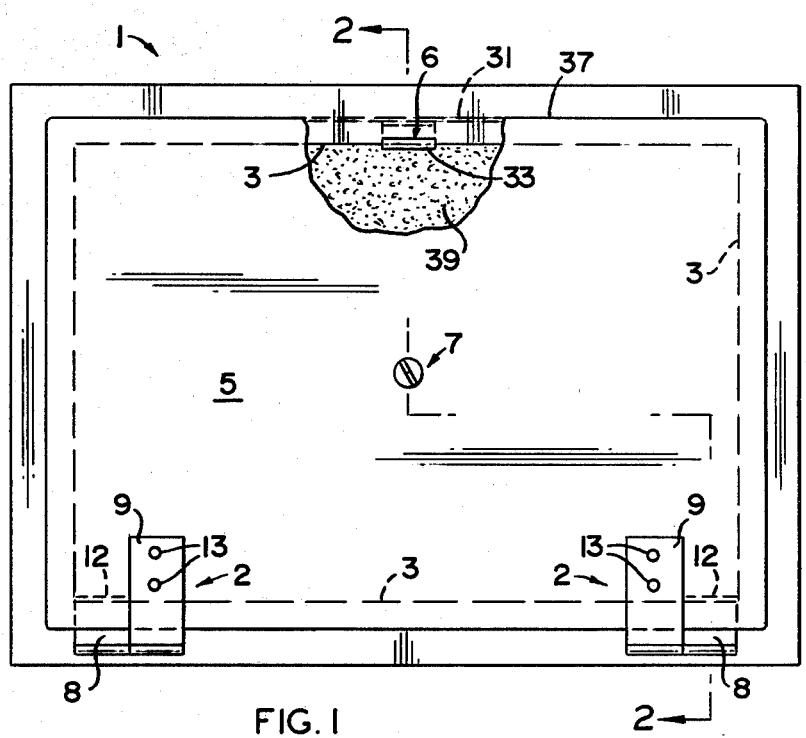
FIG. 1
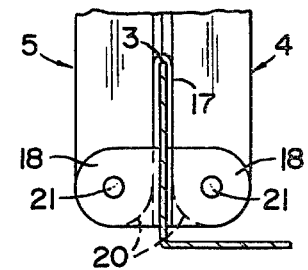
FIG. 4
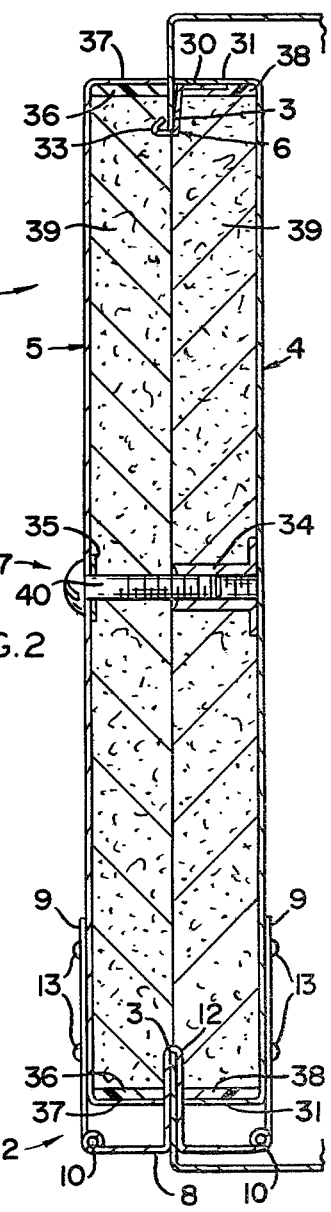
FIG. 2
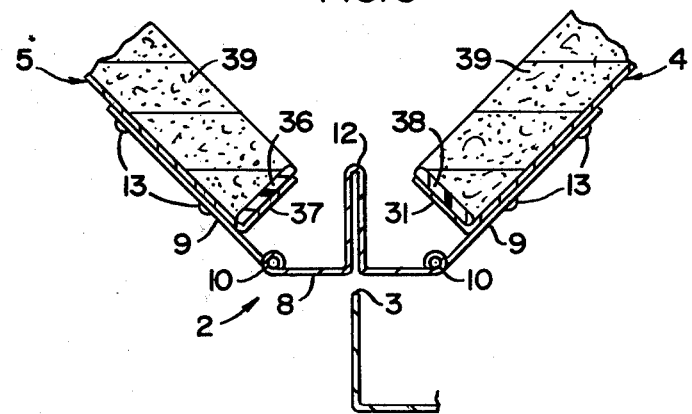
FIG. 3
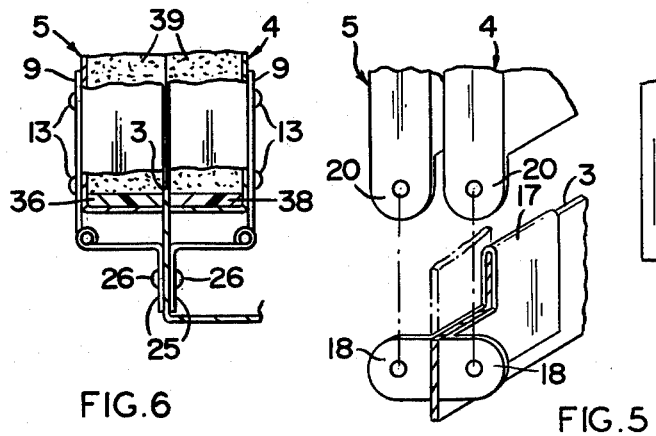
FIG. 6
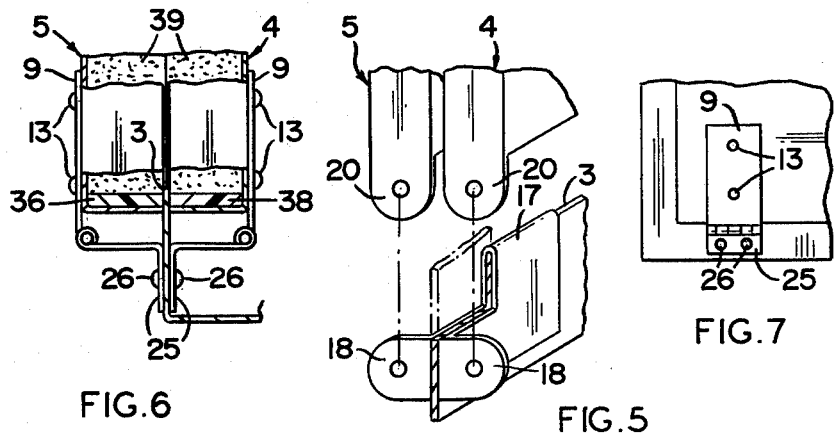
FIG. 5
FIG. 7

ACCESS DOOR

This is a continuation of application Ser. No. 719,736, filed Sept. 2, 1976 now abandoned.

BACKGROUND OF THE INVENTION

1. Field of the Invention

This invention relates to an access door primarily designed to provide an insulated entrance to heating, ventilating and air conditioning ducts. More particularly, this invention pertains to a two-pan structure lockably connected together and hinged to the duct. By a simple unfastening action, access to the duct is provided.

2. Description of the Prior Art

Presently there exist numerous devices, generally doors, designed to provide an entrance to an area. When doors are utilized, they generally are the conventional fixed hinged door although more elaborate swinging or removable arrangements may be used. Doors of this type provide access to areas such as electrical panel boxes, wall service outlets and plumbing networks. Typical access door assemblies are seen in U.S. Pat. Nos. 3,537,212, 2,766,856 and 1,921,051. For certain needs, such as air conditioning ducts, removable panels have been devised. They usually comprise a frame securely fastened to the surrounding wall of the duct. A flat sheet metal pan easily disconnectable from the frame enables easy access. Since the frame must be securely fastened to the wall, its installation is quite expensive. For sheet metal work, expensive installation is undesirable.

The prior art also discloses closures designed to removably seal apertures such as windows. For example, U.S. Pat. No. 2,772,447 discloses a panel assembly connected to the wall by a fastening means. The fastening means comprises a plurality of beams straddling the aperture on the opposite side of the said wall. Such closure means do not comprise an easy access door. They require complete removal of the closure means and for such reason, are too cumbersome. Also such closure means do not easily provide acoustical or thermal insulation properties nor are they generally aesthetically pleasing.

Since mechanisms such as fire dampers contained within ducts periodically require inspection and servicing, it is most desirous for the access to insulatingly cover the opening and then, when need be, allow convenient access to the mechanism.

An object of this invention is to provide a simple, yet durable structured access door.

Another object is to provide an insulated access door.

Still another object is to provide an access door which facilitates easy entrance into the aperture.

Another object is to provide an access door which has unique hinge and fastening means facilitating quick and easy entrance.

Another object is to provide an access door which can be quickly and easily installed in ducts.

Other objects of the invention will in part be obvious and will in part appear hereinafter.

SUMMARY OF THE INVENTION

An access door structure has now been devised primarily designed to provide entrance into heating, ventilating and air conditioning ducts. It has a two-pan structure with a sealing gasket positioned around the sides of each pan. Each pan is filled with insulation. The pans, being sized slightly greater than the opening into the duct, are self sealing. They are fastened by fastening means of the quick release type.

Such two-pan structure provides a unique ability to maintain its sealing properties even under high pressure. In the conventional panel-hinge assembly, high pressure present in high velocity ducts tends to push the panel away from the edge of the opening to break the seal and cause it to leak. In contrast, as pressure increases, the inner pan of the two-pan structure of this invention increasingly creates a better seal.

Another feature of the two-pan structure of this invention is that it actually provides additional support to the usual thin, weak and easily deformable duct material used. The customary large amount of stress encountered at the opening is thereby counteracted. Even paper thin ducts can be used without concern for ripping or deforming the edge of the opening.

Another feature of the two-pan structure of this invention is its ability to correct the deformations in the edge of the opening that usually occur in making the opening. Usually, openings in ducts are created by simply cutting the desired configuration with a pair of sheet metal shears. Shears deform the edges into a wavy surface. The two-pan structure of this invention, upon tightening, act to correct these deformations.

A further feature of the two-pan structure of the invention is the unique double hinge means which comprises a U-shaped portion hingely connecting each pan to the edge of the opening of the duct. The U-shaped portion removably slips over the outermost portion of the opening. When installed, the pans pivotly move away from each other from their parallel sealed position allowing easy access to the mechanism within the duct.

A feature of the double hinge means is the ease of installation. In duct work, time is extremely valuable. Any simplification in installation procedure provides a desired economy. To install the access door of this invention, an opening of appropriate size is roughly cut into the duct. The access door assembly, which can be completely fabricated at a factory, is then simply diagonally inserted into the opening and then twisted into a seated position. The U-shaped portion of the double hinge means is slipped over the edge of the opening. The two pans of the assembly are then locked together. No connection to the edge of the opening by any time-consuming connecting means such as rivets, is necessary.

The locking means employed may be any standard locking means which lock the two pans together. A bead chain assembly, a cam fastener assembly means such as the one disclosed in U.S. Pat. No. 1,921,051 or a threaded boss and stud assembly may be used.

It should be emphasized that while this description is specific to use with heating, ventilating and air conditioning ducts, it is possible to adapt the subject invention to other areas of use.

The invention accordingly comprises the features of construction, combinations of elements and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing.

BRIEF DESCRIPTION OF THE DRAWINGS

FIG. 1 is a front face view of the access door of the invention;

FIG. 2 is a sectional view along lines 2—2 of FIG. 1;

FIG. 3 is a detailed sectional side view of the hinge means in partially opened position;

FIG. 4 is a side view of another embodiment of the hinge means;

FIG. 5 is a perspective view of the hinge means of FIG. 4;

FIG. 6 is a side view of still another embodiment of hinge means; and

FIG. 7 is a front view of the hinge of FIG. 6.

Similar reference characters refer to similar parts throughout the several views of the drawing.

DETAILED DESCRIPTION OF THE PREFERRED EMBODIMENT

As best seen in FIGS. 1 and 2, the access door of this invention consists of a two-pan assembly 1, each attached to a double hinge means 2.

Hinge means 2 straddles edge 3 of the opening in the duct. The two-pan assembly 1 has an inaccessible first pan 4, an accessible second pan 5, a clip 6 and a pan fastening means 7.

The double hinge means 2 may take various configurations. In FIG. 3, it is shown as an edge clip 8 which straddles the edge 3 of the opening in the duct. Hinge leaves 3 through hinge pins 10 are pivotably connected to the outer edges of the clip. The U-shaped mid-portion 12 removably straddles the edge 3 of the opening in the duct. The leaves 9 are fastened by fasteners, such as rivets 13 to the pans.

The second embodiment of hinge means 2 seen in FIGS. 4 and 5 consist of a U-Shaped center 17 with two ears 18. The ears 18 pivotly engage tabs 20 formed as an integral part of pans 4 and 5. The tabs 20 are pivotably secured to the ears 18 by pins 21.

The third embodiment hinged means 2 seen in FIGS. 6 and 7 consist of angle elements 25 which are fastened to the edge 3 of the opening by connecting means, such as rivets 26.

As best seen in FIG. 2, the clip 6 comprises a leaf spring 30 securely fastened to the side 31 of the inacessible pan 4. Hook portion 33 hooks onto the edge 3 of the opening in the duct to retain the inacessible pan 4 in closed position. The pan fastening means 7 consists of a threaded boss 34 securely fixed to the inside of the inacessible pan 4. Threaded stud 40 connects to the stud when the two-pan assembly is in its closed position.

Two sealing gaskets 36 and 38 are positioned around the inside edges of each pan to improve sealing.

The interior of the pans are filled with an insulating material 39. The insulating material 39 may be selected to have certain inherent properties such as good thermal or acoustical insulating properties.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described,

What is claimed is:

1. An access door for use in combination with an opening in a heating, ventilating or air conditioning duct defined by top, bottom and side edges, comprising in combination;
   - a first pan for the interior of said duct, said first pan having a configuration which enables the pan to be inserted through the opening and to overlap edges of the opening when placed in registration with the opening;
   - a second pan for the exterior of said duct, said second pan having a configuration which will overlay all edges of the opening;
   - means serving as a first function support for said first and second pans to establish said first pan on the inner side of the duct and for establishing said second pan on the outer side of the duct;
   - said first function support means enabling said first and second pans to be opened from one side of the duct to gain access therethrough and for enabling said first and second pans to be closed from said one side of the duct;
   - connecting means for mechanically drawing said second pan to said first pan in a primary final clamping condition to simultaneously engage the inner and outer wall surfaces of the duct for sealing the opening in the duct, which condition reinforces said side edges; and
   - whereby said clamped condition relieves the first function support of duty until reinstated by release of the connecting means for removal of the panel couple.

2. An access door for use in combination with an opening in a heating, ventilating or air conditioning duct, comprising in combination:
   - a first and a second pan;
   - means for pivotably mounting said first and second pans for establishing said first pan on the inner side of the duct and for establishing said second door on the outer side of the duct;
   - said means for pivotably mounting said first and second pans comprises a U-shaped structure established for straddling the inside and outside of the duct;
   - plural hinge means connected to said U-shaped structure for pivotably mounting said first and second pans; and
   - connecting means for connecting said second pan to said first pan enabling said first and second pans to simultaneously engage the inner and outer wall surfaces of the duct for sealing the opening in the duct.

3. An access door as set forth in claim 2, wherein said U-shaped structure removably straddles the edge of the opening.

4. An access door as set forth in claim 3, wherein said hinge means comprises a center U-shaped saddle and two ears on the door hingedly secured to the ears of said center U-shaft saddle;
   - each of said ears hingedly connected to one of said first and second pans.

5. An access door for use in combination with an opening in a heating, ventilating or air conditioning duct, comprising in combination:
   - a first and a second pan;

pivotable means for pivotably mounting said first and second pans for establishing said first pan on the inner side of the duct and for establishing said second pan on the outer side of the duct;

said pivotable means enabling said first and second pans to be opened from one side of the duct to gain access therethrough and for enabling said first and second pans to be closed from said one side of the duct;

connecting means for removably connecting said second pan to said first pan enabling said first and second pans to simultaneously engage the inner and outer wall surfaces of the duct for sealing the opening in the duct; and said first pan having clip means insertable over the edge of said opening for holding said first pan in the closed position on the inner side of the duct.

6. An access door for use in combination with an opening in a heating, ventilating or air conditioning duct, comprising in combination:

a first and a second pan;

an insulating material secured to the interior of one of said first and second pans;

pivotable means for pivotably mounting said first and second pans for establishing said first pan on the inner side of the duct and for establishing said second pan on the outer side of the duct;

said pivotable means enabling said first and second pans to be opened from the outside of the duct to gain access thereto;

clip means insertable over the edge of the opening of the duct for holding said first pan in the closed position on the inner side of the duct; and connecting means for removably connecting said second pan to said first pan enabling said first and second pans to simultaneously engage the inner and outer wall surfaces of the duct for sealing the opening in the duct and for enabling subsequent access through the opening in the duct.

7. A closure for a wall opening, comprising:

a unitary double panel closure having a first and second panel each configured the same as the wall opening and in a size larger than the corresponding wall opening to overlay and close the opening;

at least one panel having one dimension enabling the panel to pass through the opening with the plane of the panel at an angle to the plane of the wall; and an offset hinge structure having a saddle to fit over the wall edge outlining one side of the opening, a first hinge strap carried by the said at least one panel and pivotally connected to said saddle a distance from said wall edge and a second hinge strap carried by the other panel and pivotally connected to said saddle a distance from said wall edge, said distances being related to the panel dimensions such that when the saddle is seated on the wall edge the panel will overlap the wall opening at the saddle and extend from the pivotal connection to an overlapped condition with the wall opening opposite the saddle; and means to hold the inner panel in temporary engagement with the wall structure and means to removably lock the panels together in a clamping action upon the wall structure, whereby the hinge structure becomes passive and the panels lock upon and reinforce the wall opening, but regains usefulness during removal of the closure.

* * * * *